March 29, 1927. 1,622,502
C. N. FAIRCHILD
MANUALLY CONTROLLED LOCK
Filed July 27 1925   2 Sheets-Sheet 2

Inventor
Charles N. Fairchild
Henry H. Snelling
Attorney

Patented Mar. 29, 1927.

1,622,502

UNITED STATES PATENT OFFICE.

CHARLES N. FAIRCHILD, OF MILFORD, CONNECTICUT, ASSIGNOR TO FAIRCHILD LOCK CORPORATION, OF NEW YORK, N. Y., A CORPORATION OF DELAWARE.

MANUALLY-CONTROLLED LOCK.

Application filed July 27, 1925. Serial No. 46,368.

This invention relates to mechanisms wherein there is a movable member capable of passing from one position to another and back, and which is locked at each end of its travel. The principal object of the present invention lies in the provision of a device of the character described so constituted that the member is held in its last position until after the key controlled release is operated and the key removed bodily from its keyhole in the lock.

A further object of the present invention lies in the provision of an automobile steering post lock in which the main locking bolt is operated simultaneously with the ignition switch, and in which when the device is locked the bolt cannot be withdrawn or the ignition circuit opened until the key is withdrawn from the lock, and similarly one in which when the device is locked the ignition cannot be closed until the lock is operated and the key withdrawn therefrom.

There are on the market at the present time, automobile steering post locks wherein the action of the ignition switch and of the steering post locking mechanism is controlled by mechanism which cannot complete its function until after the key has been withdrawn from the lock, but in all of those with which I am familiar the key itself directly and positively locks or unlocks the steering post locking mechanism.

It is desirable under certain circumstances to provide a lock which shall be manually controlled in both directions, but in applying such a contrivance to an automobile it is quite essential that some means be had for holding the main locking bolt in locked position until a series of movements is completed which will insure the opening of the ignition circuit, and even more important the provision whereby the completion of the steering post locking cycle shall be dependent upon some means which first opens the ignition switch.

The advantage of such steps lies in the protection given to the insurance companies by the assurance that the automobile operator is prevented from a careless leaving of the automobile in such manner as to facilitate the theft of the car, as would occur for example, if the operator could at his own volition open the ignition circuit without locking the car.

In the drawings:—

Figure 1:
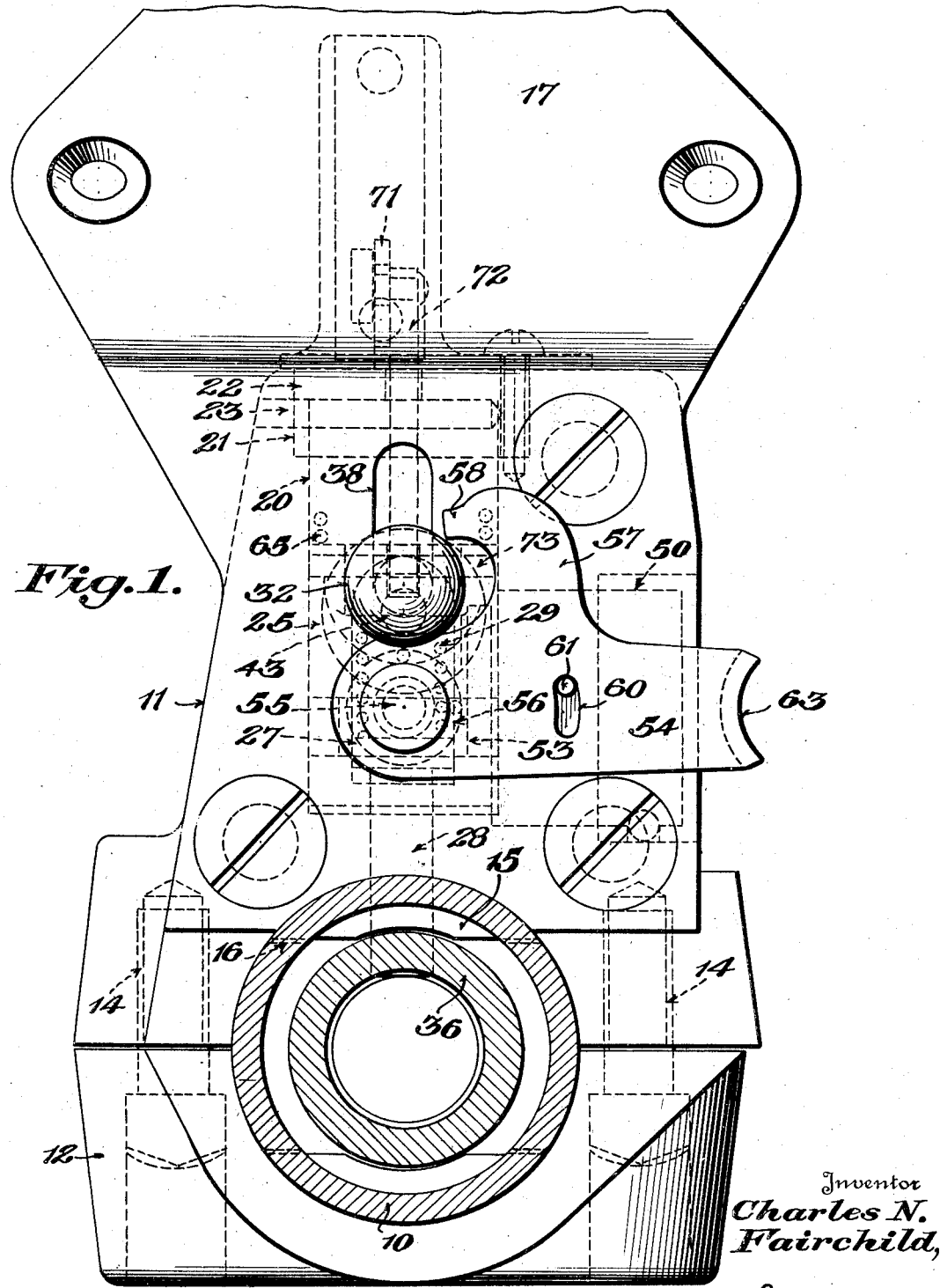
Figure 1 is a view looking down the steering post column.

The housing surrounding the steering post column is in accordance with usual practice in two sections 11 and 12, secured together in permanent fashion as by the oneway screws 14. I prefer that the larger sections of the housing 11 shall have a bridge 15 fitting in a slot 16 in the steering post casing, jacket or column 10 to prevent movement of the housing with respect to the steering post casing and to reduce to a minimum the unsupported portion of the bolt. The housing as a whole is supported from the cowl (not shown) by means of a bracket 17.

The main bore 20 of the housing has its center line radial with respect to the steering post assembly and this bore is enlarged or counterbored at the top as at 21 to receive a cylindrical cap 22 held in place by a pin 23 or other similar fastening means, this cap closing the upper open end of the bore. A plunger 25, preferably cylindrical, fits the bore rather snugly and slides therein. The plunger is hollow and its central bore receives the head 27 of the bolt and a cylindrical stopper 30 closing the central bore of the plunger.

A stem 31 having a spherical head 32 passes through the plunger 25 and the plug or stopper 30, securing these in relatively fixed position and serving at the same time as a handle by means of which the locking bolt is withdrawn from or moved into position to lock the steering post tube. Movement of the plunger 25 up and down in the central bore is limited at top and bottom by engagement of the stem 31 with the ends of a slot 38 through the housing and also through the bracket 17.

Figure 2:
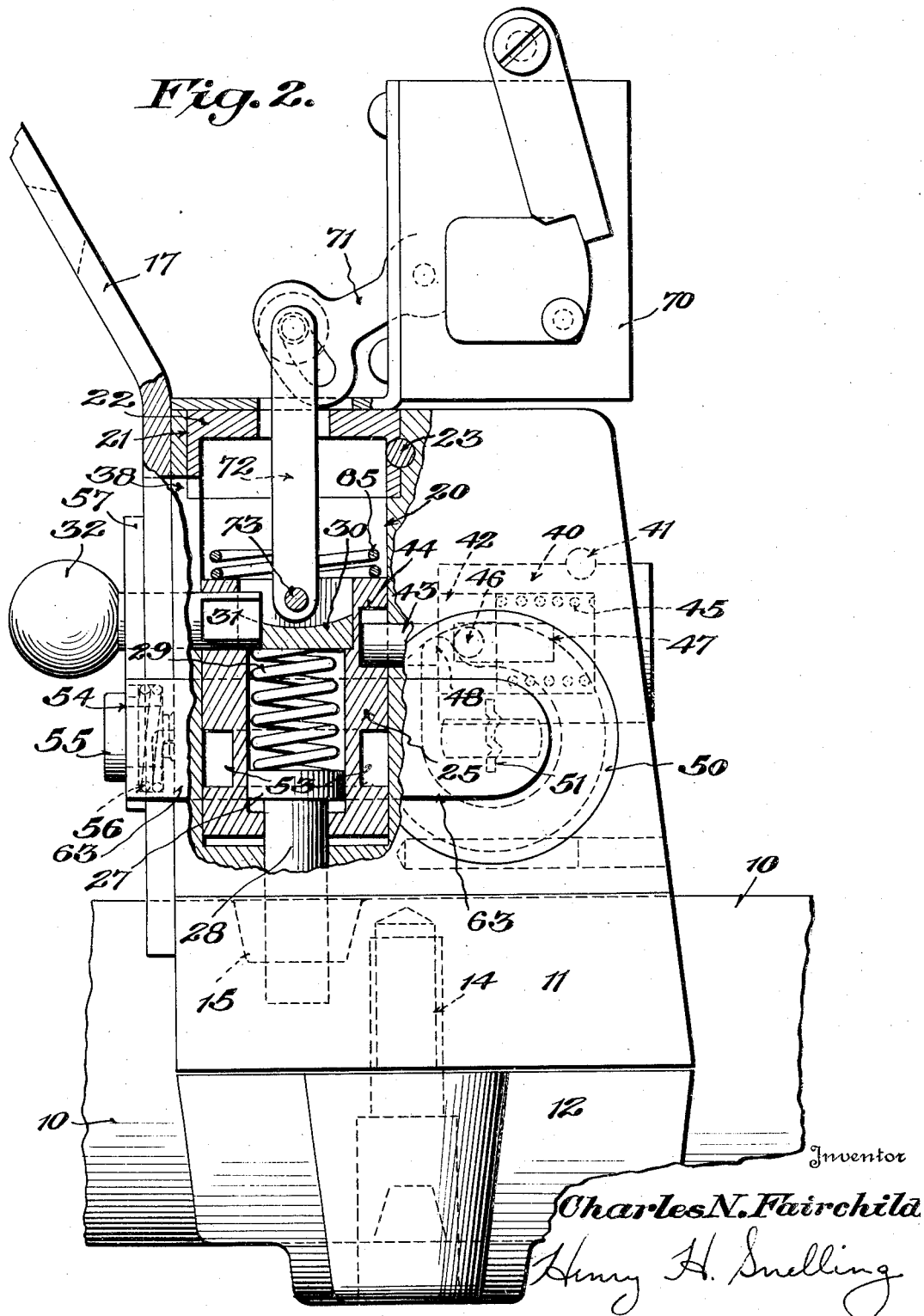
Figure 2 is a view at right angles thereto and partly broken away for clearness of disclosure.

A hollow plug 40 is pinned to the housing as at 41 and slidably receives therein a head 42 preferably integral with the bolt 43, which is shown in Figure 2 as projecting within a small cavity 44 in the plunger and therefore locking the plunger in its lowermost or locked position, the bolt 43 being held in such position by means of the spring 45 confined within the plug 40. A small pin or lug 46 passes through the bolt 43, extends through the slot 47 in the slabbed side of the plug 40 and into engagement with a cam or lever 48 fast on the end of the cylinder of the plunger type lock, the barrel of which is indicated at 50 and the key hole slot of which is indicated at 51.

By placing the key (not shown) in the slot 51 and turning in a clock-wise direction the cam 48 will engage the pin 46, compress the spring 45 and withdraw the bolt 43, so that the plunger 25 may be moved upwardly to unlocking position by raising the ball head 32 of the handle. When the parts are in their uppermost position the spring 45 will cause the bolt 43 to engage the circular groove 53 at the bottom of the plunger (in absence of mechanism not yet described) and therefore lock the plunger in unlocked position.

An angular lever 54 is pivoted to the housing as at 55, and is held in position shown by means of a torsion spring 56, one end of which is secured to the lever and the other end to the housing. The main portion of this angular lever as seen in Figure 1 has at its top a hook 57 ending in a tooth 58, the lower side of which limits upward movement of the stem 31 when the locking bolt 28 is in steering tube locking position, and the upper portion of which holds the stem 31 against downward movement when the parts are in running position.

The lever 54 is slotted as at 60 and a pin 61 secured to the housing limits the movement in either direction, the spring 56 normally holding the free end of the lever downward in such position that the long arm 63 of the lever has its end about central of the key hole slot 51, and consequently barring entry of the key into the lock. The curved form of the free end of the lever, as shown in the drawings, is found preferable by reason of the added strength and also for convenience in moving it by hand so that the free end or arm 63 may be raised to allow the key to be inserted into the lock at which time the end 58 of the hook prevents movement of the stem 31 from the position in which it was last manually placed. At such time both of the plunger locking mechanisms are in active position and the hook necessarily lies in such position as long as the key is in the lock, but as soon as the key is taken out of the lock the spring 56 lowers the angular lever and frees the stem or handle 31, or if the spring 56 be omitted the lever 54 falls by gravity.

In order to maintain the bolt 43 retracted when once it is moved back or withdrawn by the key and the cam 48, I provide a little play between the stem 31 and the hook 57, so that just as soon as as the bolt 43 is withdrawn the spring 29 raises the plunger slightly upward so that when the key is taken out of the lock movement of the bolt 43 by urge of the spring 45 engages the side wall or cylindrical surface of the plunger just below the recess 44, so as to offer no resistance to the later upward movement of the plunger by means of the ball 32. It must be remembered again that the plunger cannot be raised upward while the key is in the lock for until the key is taken out the hook 57 lies in the path of movement of the stem 31.

To unlock the automobile the key is taken out of the lock, the plunger is raised manually to free the locking bolt 28 from the steering post tube 36 and when the locking bolt is moved in this manner the spring pressed bolt 43 completes its forward movement and engages the circular recess at the lower end of the plunger and prevents its movement downward until after the key has again been placed in the lock, the lock turned and the key withdrawn. The function of the spring 65 which rests loosely at the top of the plunger 25 and does not engage the flat bottom surface of the cap 22 until the plunger is in its uppermost position, is to advance the plunger slightly downward when the bolt 43 is withdrawn while the plunger is in its uppermost position. This, as in the previous case, is to insure that the bolt 43 will engage the cylindrical surface of the plunger upon withdrawal of the key from the lock.

The ignition switch 70 is of well known commercial type having a lever 71 pivoted to a link 72 pivoted at its lower end as at 73 to the plug 30 of the plunger 25. At the instant the plunger reaches its uppermost position the ignition switch is snapped on to close the ignition circuit and as the plunger reaches its lowermost position with the locking bolt 28 engaging either the recess in the steering post or the smooth outer surface of the steering post as the case may be, the ignition switch is snapped off to open the ignition circuit.

In case, as it frequently happens, the steering wheels of the automobile are not parallel with the center line of the automobile when the automobile is locked the locking member 28 does not actually lock the steering post until the wheels are brought in a straight ahead position, at which time however the locking member or bolt 28 is automatically shot downward by the urge of the spring 29. By making the bolt 28 longer it is possible to force the driver to aline the automobile wheels to shoot the bolt home into the recess in the steering tube before he can open the ignition circuit, but I prefer the design illustrated as it is the commercial style and secures all the advantages of the longer bolt type.

What I claim is:—

1. In combination, a member movable from one position to another, a bolt to prevent movement of said member from its last position, key operated mechanism for withdrawing said bolt, and independent means for barring the member from passing to its next position while the key is in the key operated mechanism and movable out of such barring position when the key is removed from said mechanism.

2. In combination, a member movable from one position to another, a bolt spring pressed to position to prevent movement of said member from its last position, key operated mechanism for withdrawing said bolt, independent means for barring the member from passing to its next position while the key is in the key operated mechanism, and means for automatically moving said barring means out of barring position immediately upon withdrawal of the key from the key operated mechanism.

3. In a lock, a locking member, means for manually moving said member to locked or to unlocked position, means for holding said manually operated means against movement from one position to the other, key operated mechanism for withdrawing said holding means, and means for holding the member in its last position until after the withdrawal of the key from its mechanism.

4. In a lock, a locking member, means for manually moving said member to locked or to unlocked position, means for holding said manually operated means against movement from one position to the other, key operated mechanism for withdrawing said holding means, and means for holding the member in its last position until after the withdrawal of the key from its mechanism, said last mentioned means being manually operated in one direction.

5. In combination, a switch assembly including a switch lever and a locking pin connected together for simultaneous movement to "on" and unlocked position or to "off" and locked position, a bolt for holding said assembly in its last position, means including a key for withdrawing said bolt to permit said switch lever to be advanced toward its next position upon rotary movement of the key and for barring said assembly temporarily against further movement and for finally freeing the assembly to permit completion of its movement to next position upon withdrawal of the key from its key slot.

6. In combination, a member movable from one position to another, a key operated mechanism, two independent means each movable to position to prevent movement of said member from its last to its next position, one of said means being movable by said key operated mechanism to position to free the member and the second means preventing operation of the key operated mechanism until the said second means is moved to locking position.

7. In a device of the character described, a housing, a locking member reciprocating in said housing, manually controlled means extending to the outside of the housing for moving said locking member to locking or to unlocking position, a spring-pressed bolt mounted in said housing adapted to engage said locking member to hold it in its last position, means including a key and a cylinder lock for withdrawing said bolt to permit manual movement of said locking member, and a member normally lying in position to prevent entry of the key into the lock and movable into position to prevent movement of the locking member to next position when said member is moved to permit entry of the key into the lock.

8. A plunger having two recesses therein, a locking bolt loosely mounted in said plunger, a spring holding said locking bolt to project from said plunger, a member spring-pressed against said plunger and adapted to enter one or the other of said recesses, a cylinder lock for withdrawing said member, a lever spring-pressed to position to prevent operation of said lock, and when moved from said position operating to prevent movement of said plunger while the key is in the lock and to free the plunger immediately upon withdrawal of the key from the lock.

9. In a coincidental lock, an ignition switch, a plunger, a locking member confined therein, mechanism connected to said plunger for controlling said switch, a spring-pressed bolt locking the plunger at each end of its travel, means for withdrawing said bolt, and means for moving said plunger.

10. In a steering post lock, a sliding member adapted to prevent movement of the steering tube with respect to the vehicle body, a handle therefor, key controlled mechanism for holding said member in either unlocked or locked position, a lever preventing movement of said handle when the key is in said key controlled mechanism, said lever moving to handle freeing position upon withdrawal of the key from said key controlled mechanism, said lever when in handle freeing position blocking entrance of said key to said mechanism.

11. The device of claim 10 in which the sliding member is moved toward next position immediately upon withdrawal of the locking means so as to prevent further locking of the member upon withdrawal of the key.

12. The device of claim 10 in which the key controlled mechanism includes a spring-pressed bolt, and in which the sliding member advances slightly from either position upon withdrawal of the bolt so as to prevent return of said bolt to locking position until after further movement of said sliding member.

13. The device of claim 10 in which there is a spring urging the sliding member downward when in unlocked position.

14. The device of claim 10 in which the sliding member is in two pieces which pieces are resiliently held apart by a spring between them, said spring causing the upper piece to move upwardly from locked position upon the unlocking of the sliding member, so as to prevent a relocking of the sliding member upon withdrawal of the key from the lock.

15. The device of claim 10 in which the axes of the key controlled mechanism, the pivot of the lever, and the sliding member are each at right angles to the other two axes.

16. A steering post lock having a manually controlled member for locking the steering tube and a spring-pressed, key-withdrawn bolt for maintaining said manually controlled member in the position to which it was last manually moved, characterized by the provision of a right angular lever pivoted adjacent to the manual control for the steering tube locking member and extending to position to bar entry of the key except when said lever bars movement of said manually controlled locking member.

17. The device of claim 16 in which movement of the steering post locking member operates the opening and closing of the ignition circuit.

In testimony whereof I affix my signature.

CHARLES N. FAIRCHILD.